United States Patent [19]
Watson et al.

[11] Patent Number: 5,963,013
[45] Date of Patent: Oct. 5, 1999

[54] STORAGE BATTERY CHARGING APPARATUS AND METHODS

[76] Inventors: James L. Watson; Janet C. Watson, both of 324 Brim Drive, Macon, Ga. 31220

[21] Appl. No.: 08/848,284

[22] Filed: Apr. 29, 1997

[51] Int. Cl.⁶ .................................................. H02J 7/00
[52] U.S. Cl. .................. 320/107; 320/116; 307/10.1; 280/414.1; 324/426
[58] Field of Search .................... 320/116, 117, 320/DIG. 34, 107; 307/10.1; 280/414.1; 324/426

[56] References Cited

U.S. PATENT DOCUMENTS

| | | | |
|---|---|---|---|
| 3,090,871 | 5/1963 | Gorman | 307/10.1 |
| 4,081,738 | 3/1978 | Roller | 320/117 |
| 5,283,513 | 2/1994 | Fujita et al. | 320/138 |

*Primary Examiner*—Peter S. Wong
*Assistant Examiner*—Gregory J. Toatley
*Attorney, Agent, or Firm*—Herbert M. Hanegan; J. Rogers Lunsford III; Charles L. Warner II

[57] ABSTRACT

An apparatus and method for charging a battery in a transported apparatus from the electrical system of a transporting vehicle. In one aspect of the invention there is provided circuit means for determining when a battery has been sufficiently recharged, adapted to be respectively coupled to both the battery of the transported apparatus and the electrical system of the transporting vehicle. The circuit means may include means for determining the status of the battery being charged such as a meter, an array of lights, or an array of light emitting diodes, the number and sequence of illumination being indicative of the extent to which the battery has been recharged.

23 Claims, 12 Drawing Sheets

Fig_5

STORAGE BATTERY CHARGING APPARATUS AND METHODS

BACKGROUND OF THE INVENTION

This invention relates to battery charging apparatus and methods, and in particular to an apparatus and method for charging the battery of a transported apparatus from the electrical system of the transporting vehicle. More particularly, the invention relates to an apparatus and method of the type described wherein the battery charging operation is accomplished by connecting the voltage generating means of the transporting vehicle with the battery of the transported apparatus. Alternatively, the operation may utilize an accessory outlet, such as a vehicle's cigarette lighter, as the means for permitting passage of energy from the charging vehicle to the battery to be charged.

Many vehicles, particularly automobiles and trucks, utilize a self-contained energy source, typically a battery, to provide sufficient energy to start the engine. Once started, an internal electrical generating system, such as an alternator, ordinarily satisfies the vehicle's electric power requirements.

The present invention relates to a battery charging system whereby the battery of a transported apparatus such as a wheelchair, welder, compressor, golf cart, farm equipment, boat, vehicle, or the like, hauled within or carried by a trailer being towed by an automobile, truck or similar vehicle, is charged by the charging system of the transporting vehicle.

It is common to haul boats from place to place on trailers towed by vehicles. The boats usually include an electrical system having a storage battery as a source of power. In many of the boats, however, the electrical system does not include a battery charging apparatus. Operation of the boat will consequently discharge the battery and, after prolonged use, necessitate recharging of the battery for continued operation. The boat battery is usually of sufficient capacity to operate the electrical system of the boat for an outing but should be recharged before a subsequent use. It would be ideal if the charging could be accomplished while the boat is being towed to a different location. The towing vehicle is an ideal source of power for charging the boat battery as it is provided with a charging system for its own battery. The generator or alternator of the vehicle's charging system is usually of sufficient capacity to maintain a satisfactory charge on the battery of the towing vehicle and to recharge a boat battery.

One of the methods includes connecting the electrical system of the charging vehicle to the electrical system of the boat with a battery to be charged by means of electrical conductors engageable with an interior accessory outlet, such as a vehicular cigarette lighter. Though these methods have been used successfully, they are also subject to certain drawbacks, deficiencies and inconveniences. For example, in some such methods, it is relatively difficult for the user to determine whether the electrical system in the charging vehicle is operating sufficiently to charge the battery in the boat. Similar difficulties sometimes occur in determining whether the battery in the boat has been sufficiently recharged.

Accordingly, it is a primary object of this invention to provide an improved method and apparatus for recharging the battery in a boat, cart, wheelchair, or the like using the electrical system of another vehicle. It is another object of this invention to provide an improved method and apparatus for determining whether the battery to be charged has been sufficiently recharged by the electrical system of the charging vehicle.

It is, therefore, an object of the present invention to provide a battery charging system for the battery of a boat carried by a trailer towed by a vehicle that utilizes the charging system of the vehicle as a power source.

It is another object of the present invention to provide a battery charging system for a transported apparatus battery having a charging circuit and a voltage measuring circuit including an indicating means to determine the charged condition of either the transported battery or the transporting vehicle battery under load or that the charging system is operating satisfactorily relative to either battery.

It is also an object of the present invention to provide a battery charging system for a transported apparatus battery that can be economically fabricated in a compact housing readily attachable to the voltage generating source of the transporting vehicle.

SUMMARY OF THE INVENTION

The objects of this invention are achieved by providing means having inputs adapted to be coupled, respectively, to the battery of the transported boat, vehicle, cart, welder, compressor, wheelchair, or the like to be charged and to the electrical system of the charging vehicle. Alternatively, circuit means may be coupled between the input means and a display means. In one aspect of the invention, the display means may be illuminated and/or their sequence of illumination indicative of the extent to which the transported battery has been recharged. In this manner the user can readily determine when the transported battery has been sufficiently recharged.

DESCRIPTION OF THE PREFERRED EMBODIMENTS

The present invention is directed to an apparatus and method for charging the battery of a transported apparatus including, but not limited to a wheelchair, golf cart, farm equipment, welder, compressor, boat, vehicle or the like from the electrical system of a vehicle which is hauling or towing the apparatus, the apparatus having an outlet coupled to its battery and the transporting vehicle having an outlet coupled to its electrical system including coupling means attached to the transporting vehicle; coupling means attached to the transported apparatus; and connecting apparatus for joining the two coupling means thereby connecting the transporting vehicle electrical system and the battery of the transported apparatus.

The invention may also include a first electrical conductor coupled to a housing having first and second inputs, adapted for coupling to the transported apparatus outlet; a second electrical conductor coupled to the housing second input, adapted for coupling to the transporting vehicle outlet; circuit means, disposed inside the housing means; switch means coupled between the circuit means and the second input operable to isolate the second electrical conductor from said circuit means; and a display means visible from outside the housing, coupled to the circuit means; the display means indicating the extent to which the transported battery has been recharged.

One embodiment of the present invention is directed to a battery charging system including a combination of a towing vehicle provided with an operating electrical system having a means for generating voltage; a battery to be charged carried by a trailer towed by or operably connected to a boat, golf cart, farm equipment, vehicle, or the like carried by a towed vehicle, comprising a battery charging circuit for interconnecting the electrical system of the trailer and carried apparatus with a terminal of the voltage source supplying a battery charging voltage and a ground terminal.

Such combination may include a voltage measuring circuit for determining the charged condition of a battery connected thereto and for alternately determining the charging voltage of the system, the voltage measuring circuit including an electrical load resistance provided with an adjustable tap having a first terminal connected to the charging circuit and a second terminal connected to a grounded terminal of the towing vehicle through switch means and a meter mechanism for providing an indication, preferably visible, of the voltage of the charging system, the meter mechanism having a first terminal connected to the first terminal of the resistance and a second terminal connected to the adjustable tap of the resistance, the adjustable tap being positioned on the resistance to provide a meter indication proportional to the voltage of the charging system, the second terminal of the meter mechanism being connected to the adjustable tap of the resistance through a diode.

The combination of the present invention may include a towing vehicle provided with an operating electrical system having a means for generating voltage; a battery charging system for a battery carried by or operably connected to an apparatus hauled within or carried by a trailer towed by the vehicle wherein the battery to be charged has a voltage substantially less than that of the electrical system of the towing vehicle, comprising a charging circuit including an electrical resistance connected in series with a terminal of the battery of the hauled apparatus or of the trailer, or towed apparatus, for reducing the voltage supplied to the charging system to that required for charging of the transported battery.

Such a combination may include a switch means for alternately connecting the voltage measuring circuit with the battery to be charged to determine the charged condition thereof and for connecting the charging circuit to the battery for charging and to the voltage measuring circuit for determining the charging voltage of the system. Such voltage measuring circuit includes an electrical load resistance provided with an adjustable tap having a first terminal connected to a common terminal of the charging resistance and of the battery to be charged and a second terminal connected to a ground terminal through the switch means and a switch contact for momentarily completing a circuit therethrough, and a meter mechanism for providing an indication, preferably visible, of the voltage of the charging system, the meter mechanism having a first terminal connected by the switch means to the common terminal and a second terminal connected to the adjustable tap by the switch means. The connection may be through a diode, the adjustable tap by the switch means through a diode, the adjustable tap being positioned on the resistance to provide a meter indication proportional to the voltage of the charging system or of the trailer battery.

The present invention may also include a second electrical load resistance in the voltage measuring circuit provided with an adjustable tap having a first terminal connected to the first terminal of the meter mechanism and a second terminal connected to the ground terminal through the switch means. The switch contact and the second terminal of the meter may be connected to the adjustable tap by the switch means through a diode, the switch means being operable to disconnect the charging circuit from the voltage source and to disconnect the first voltage measuring circuit therefrom and to connect the second voltage measuring circuit to the voltage source whereby the charged condition of the battery of the towing vehicle may be determined or to determine the charging voltage supplied thereto.

Figure 1:
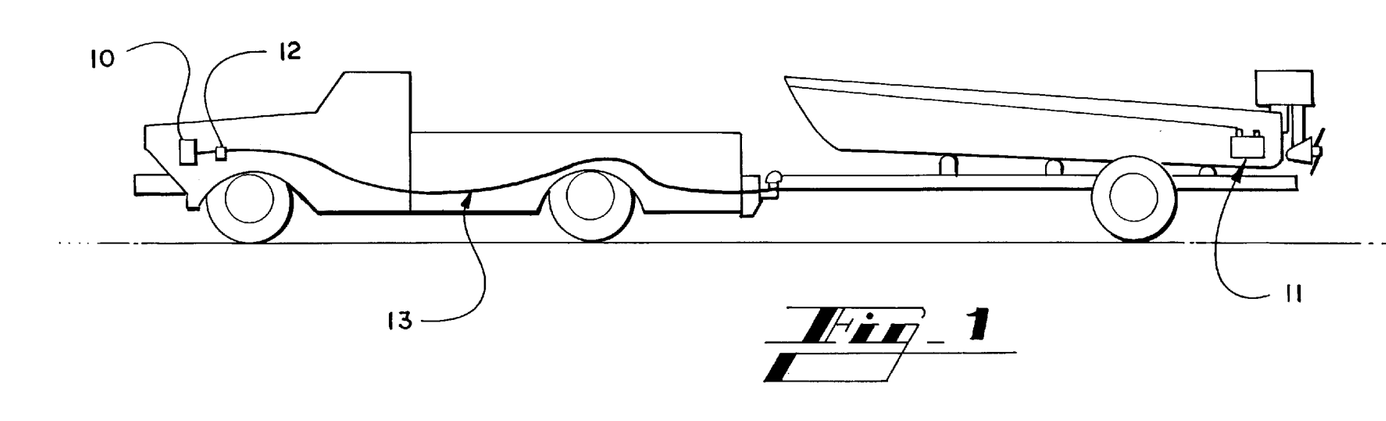
FIG. 1 is a diagrammatic view of the electrical circuit of the present invention showing the wiring harness of the charging system of a vehicle connected to the electrical system of a boat at the rear of the vehicle.

Illustrated in FIG. 1 is a vehicle towing a trailer carrying a boat thereon. The vehicle is provided with an electrical system including a voltage generating means 10 for charging a battery 11 within the towed boat. The electrical system also includes a fuse box, voltage regulator, or other charging control means, 12 interconnected therewith for controlling the charging of battery 11. Voltage generating means 10 supplies the voltage for the charging system of the invention. The wiring harness for both the vehicle and boat is shown at 13.

Figure 2:
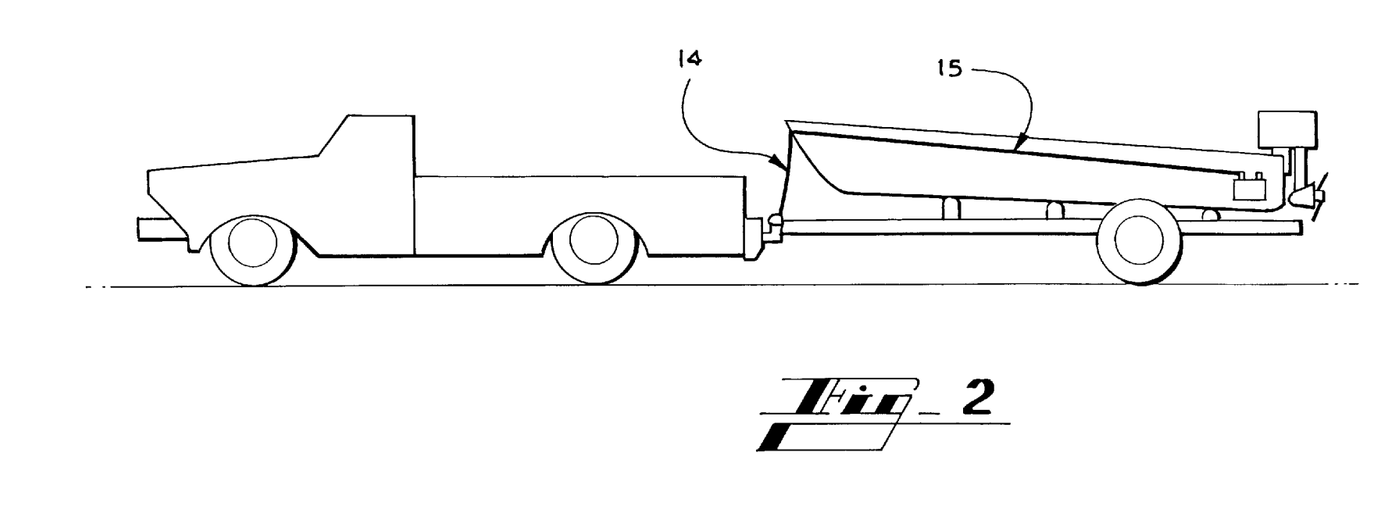
FIG. 2 is similar to FIG. 1 except that it depicts the boat wiring harness provided with an extension.

As shown in FIG. 2, a wire extension 14 can connect or plug into the connection to the vehicle wiring harness at the rear of the vehicle and connects to battery 11 by boat wiring harness 15. The batteries utilized on the boat and the vehicle may be of either the 6 or 12 volt type. When the electrical system of the vehicle and the boat are of the same voltage, either 6 or 12 volt, the battery charging circuit may be connected to a terminal of the voltage generating means through a single pole, single throw toggle switch. The circuit may be connected to the boat battery through pairs of polarized connectors. One of the connectors is mounted on the vehicle and is connected to the charging system. Another connector is mounted on the trailer and is connected thereto by a flexible cable. A circuit is completed by interconnecting the connectors. The battery of the vehicle has the positive pole thereof connected to the terminal of the voltage generating means which is the charging terminal. This charging terminal is connected to the positive terminal of the boat battery by a lead which interconnects the pole of the switch with the proper connector terminal. The connector mates with a lead connected to the positive terminal of the battery. The negative terminal of the battery is connected by a lead to a terminal which will complete a circuit through its mating connector to a grounded terminal.

A continuity indicator may be incorporated in the charging circuit to indicate a positive connection of the charging circuit with the electrical system of the boat.

One embodiment of this invention includes a voltage-measuring circuit for testing the charged condition of the batty. A meter can also be provided to indicate a voltage proportional to the battery charged condition. The meter is preferably provided with a dial having markings to provide a convenient indication of a high, medium, or low battery charge. The voltage circuit may also be utilized to monitor the charging voltage supplied by the vehicle electrical system.

Figure 3:
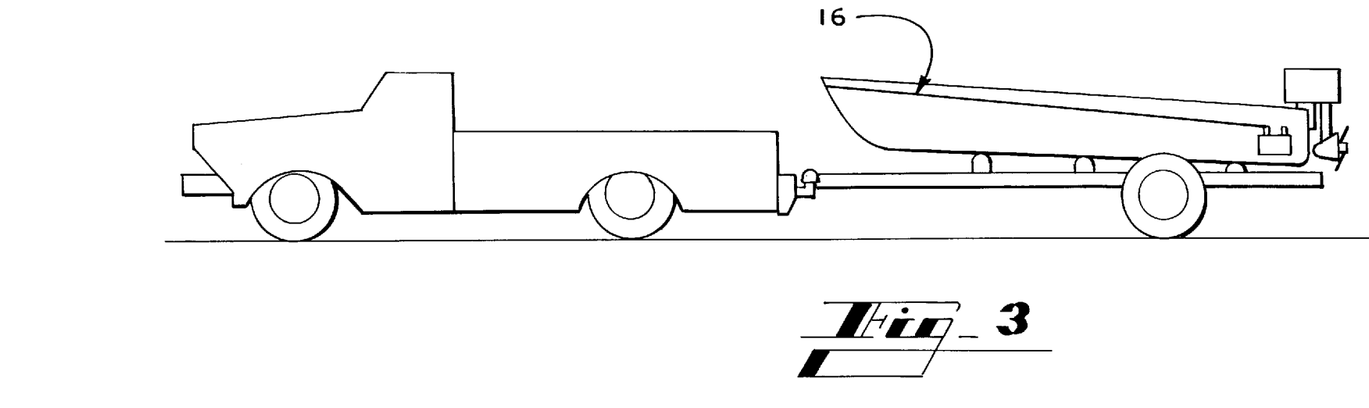
FIG. 3 is similar to FIG. 1 except that it depicts a permanently installed boat wiring harness.

FIG. 3 depicts a permanently installed boat wiring harness 16.

Figure 4:
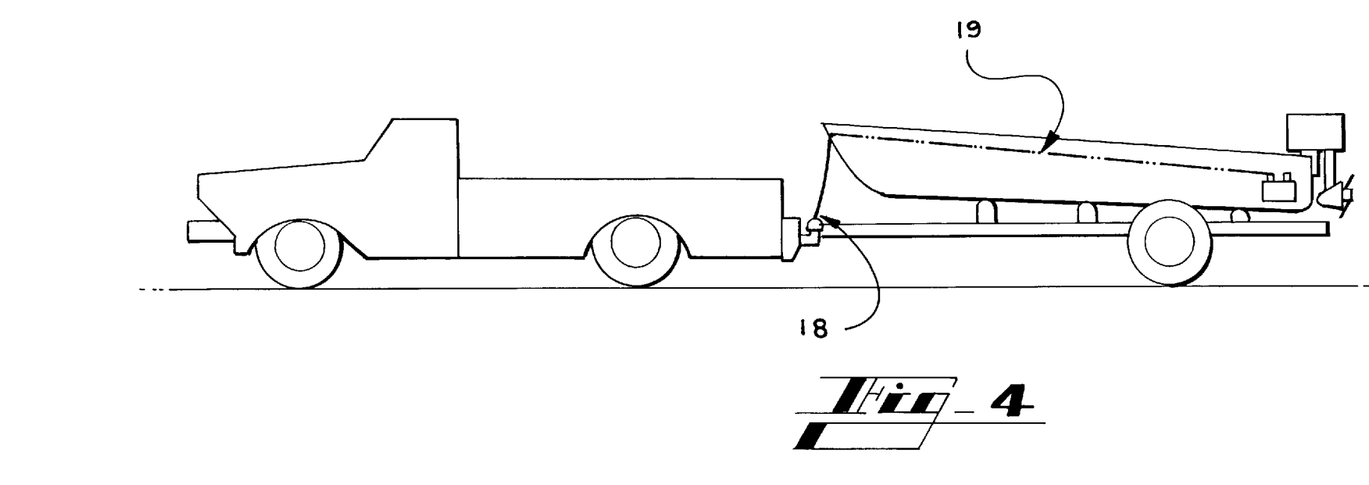
FIG. 4 is similar to FIG. 1 except that it depicts a factory prewire boat harness.

FIG. 4 shows a factory prewired boat harness 19 connected to the vehicle charging system by connector 18.

Figure 5:
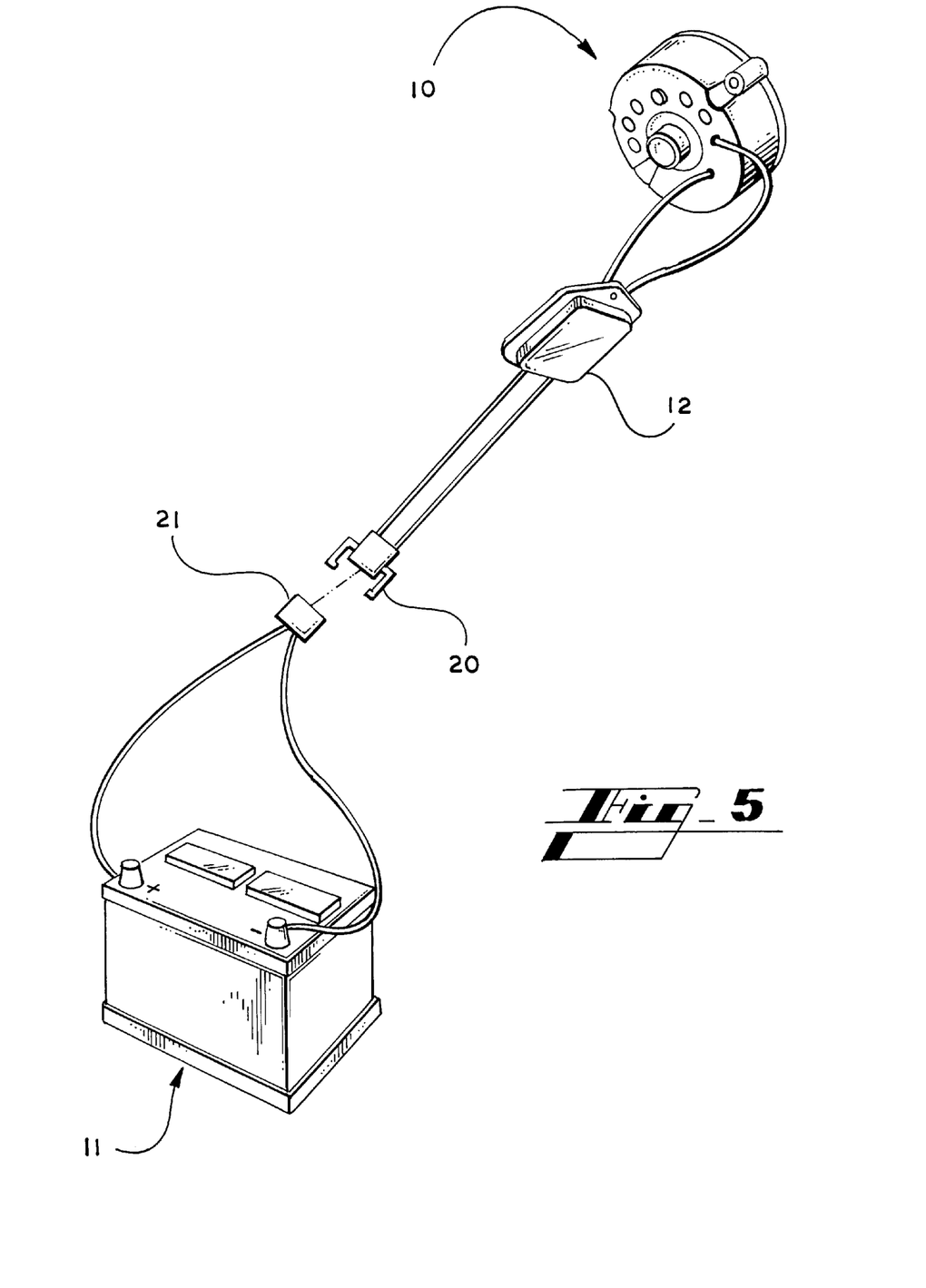
FIG. 5 is a diagrammatic view illustrating the charging system of this invention connecting the electrical system of a towing vehicle with a battery in a boat or vehicle being towed thereby.
Figure 6A:
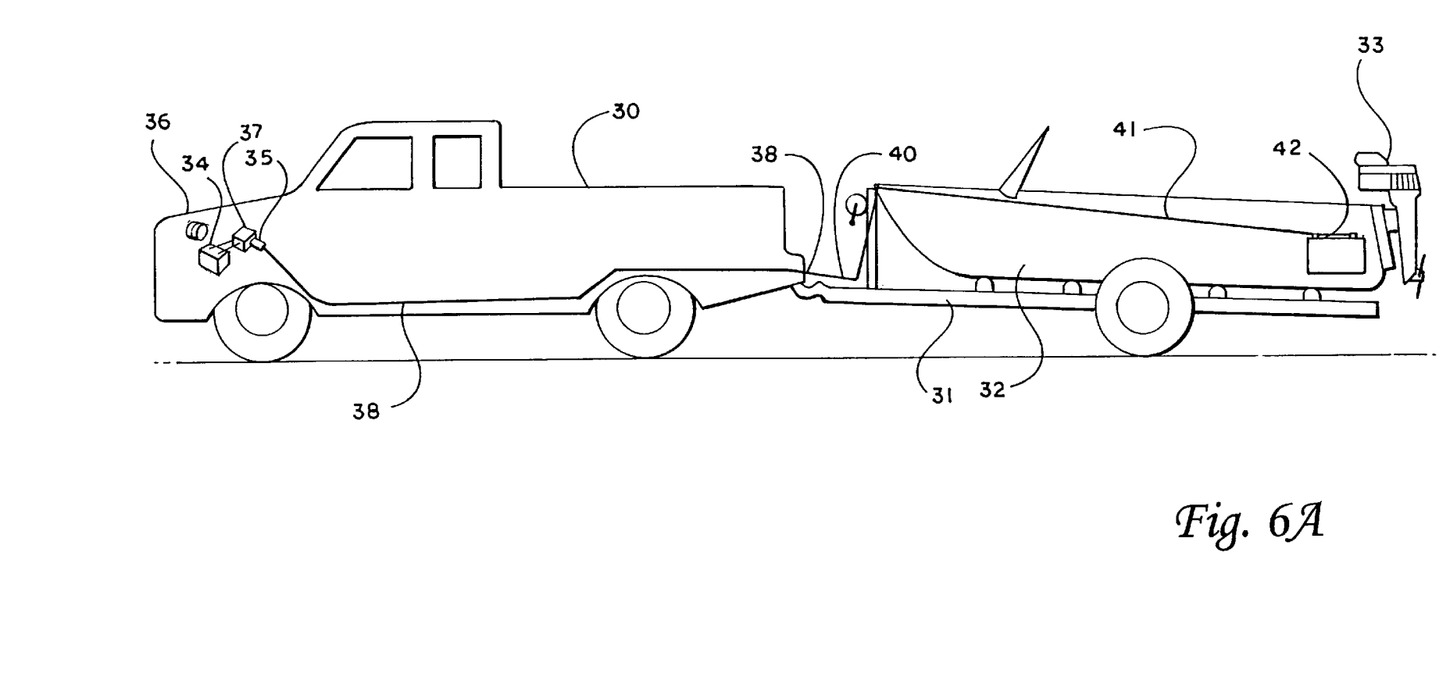
FIGS. 6A–G are diagramatic views of one embodiment of the present invention showing the charging system connecting the electrical system of a towing vehicle with the battery in a boat being towed thereby.
Figure 6B:
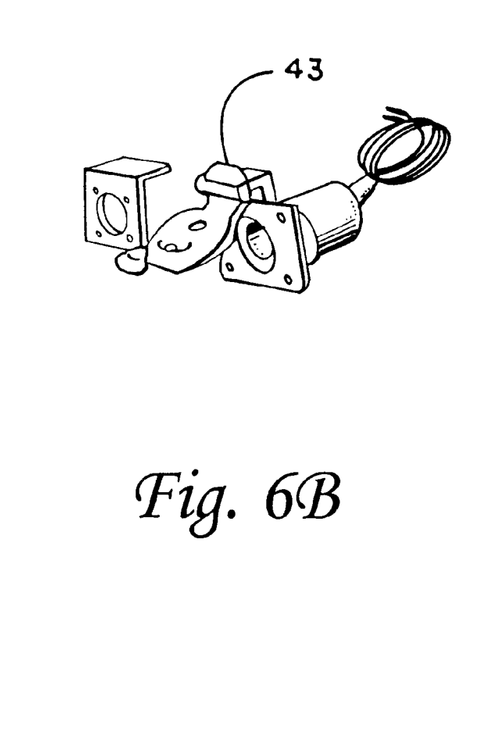
Figure 6C:
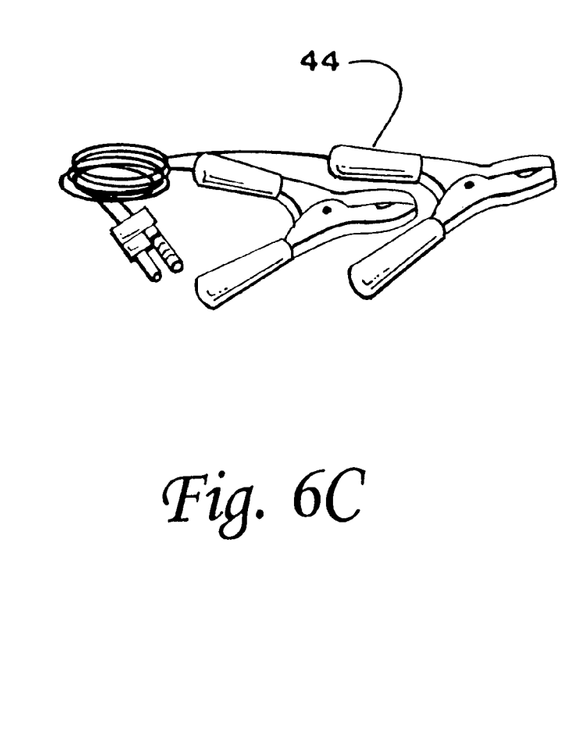
Figure 6D:
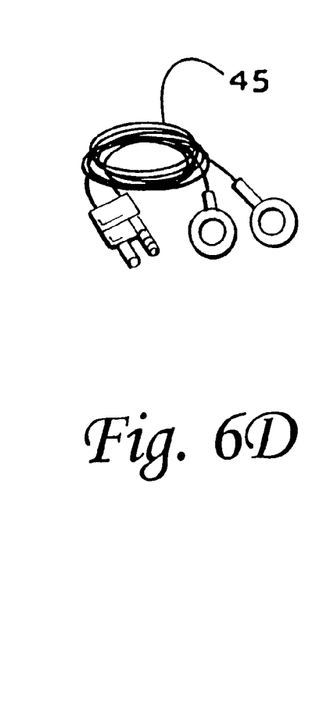
Figure 6E:
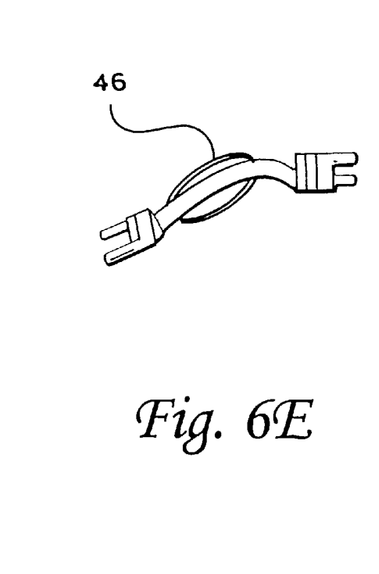
Figure 6F:
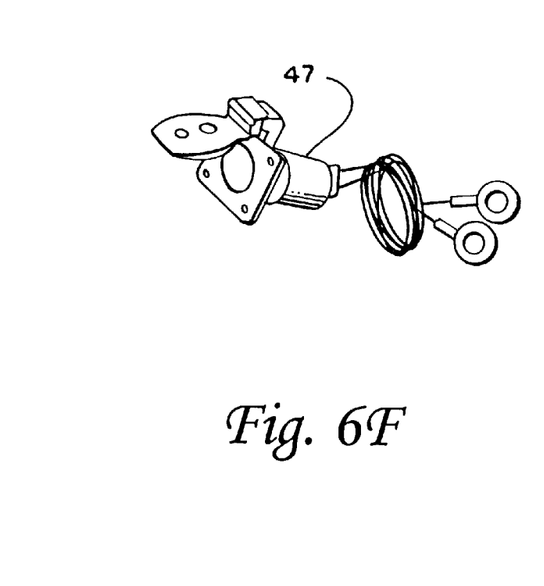
Figure 6G:
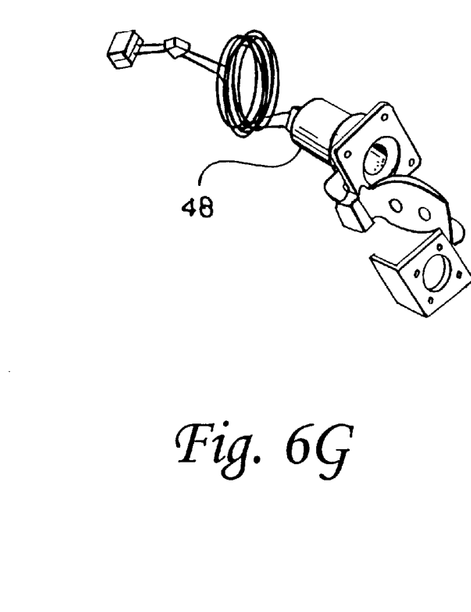
Figure 7A:
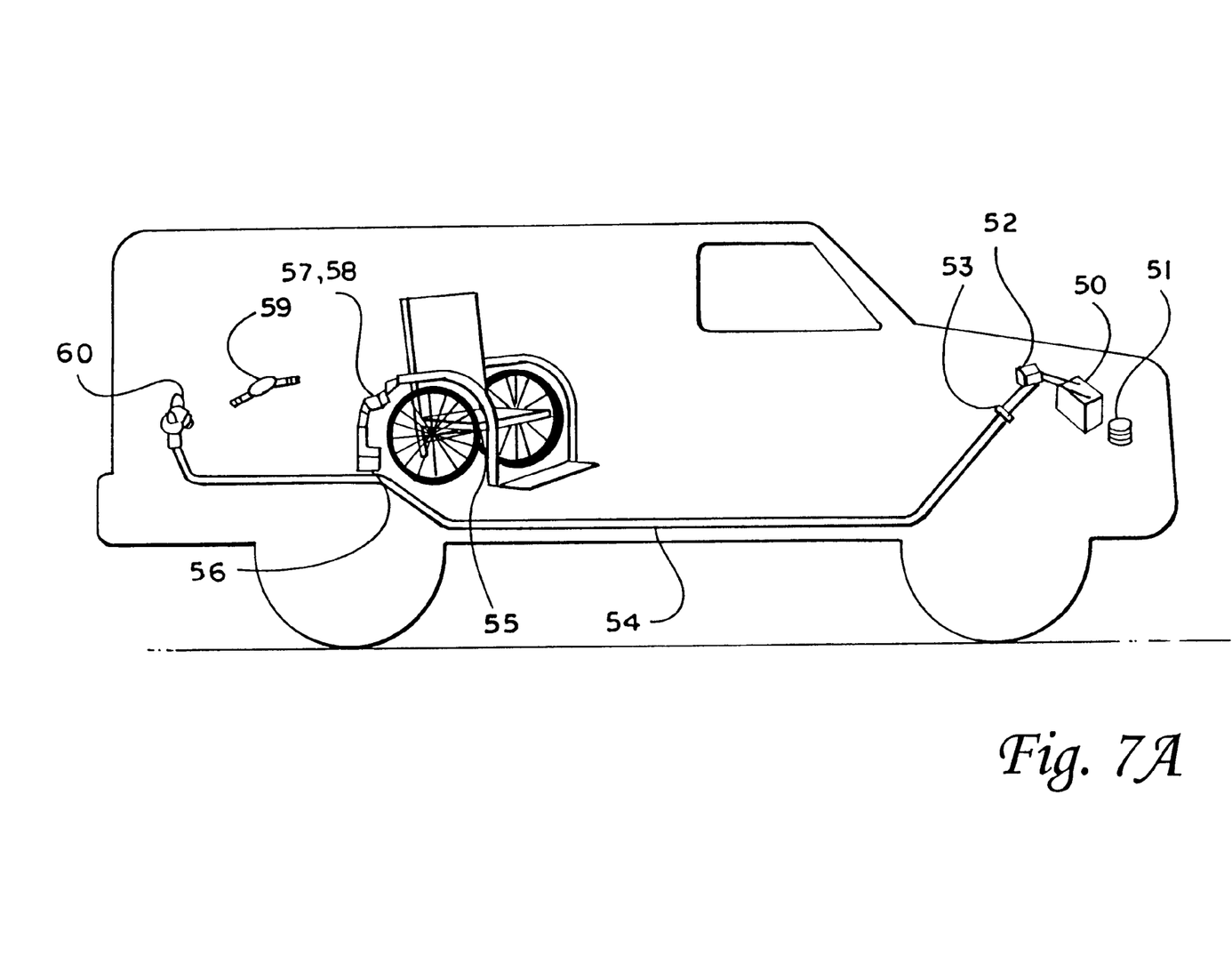
FIGS. 7A–F are diagramatic views of one embodiment of the present invention showing the charging system of the transporting vehicle connected to the battery of a wheelchair being transported thereby.
Figure 7B:
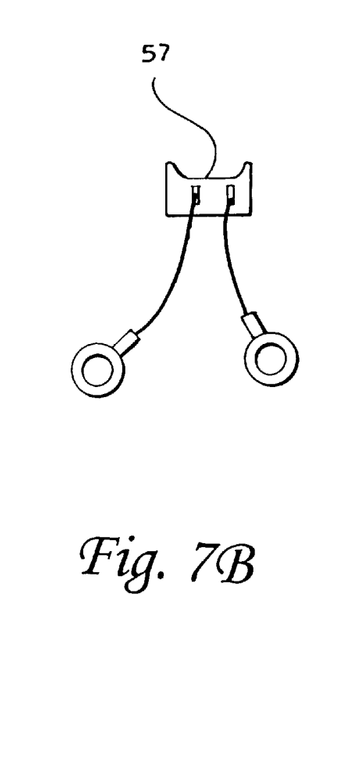
Figure 7C:
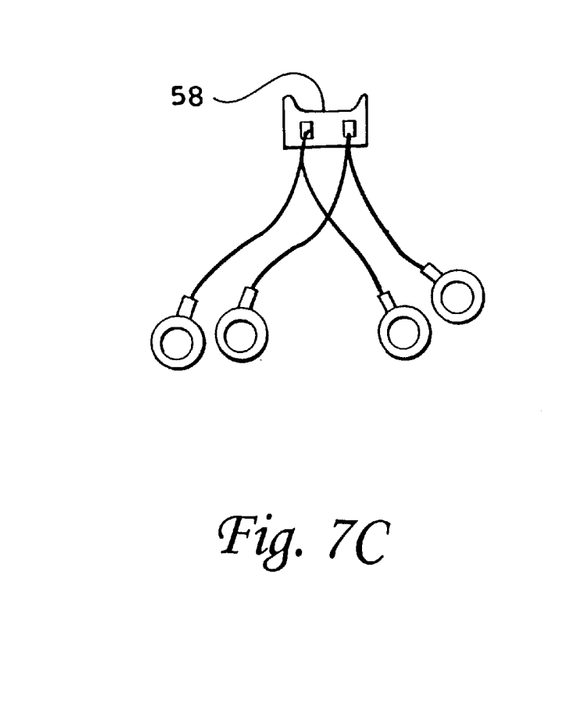
Figure 7D:
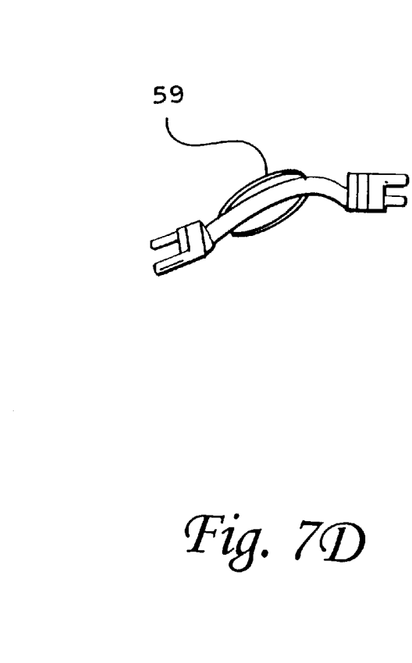
Figure 7E:
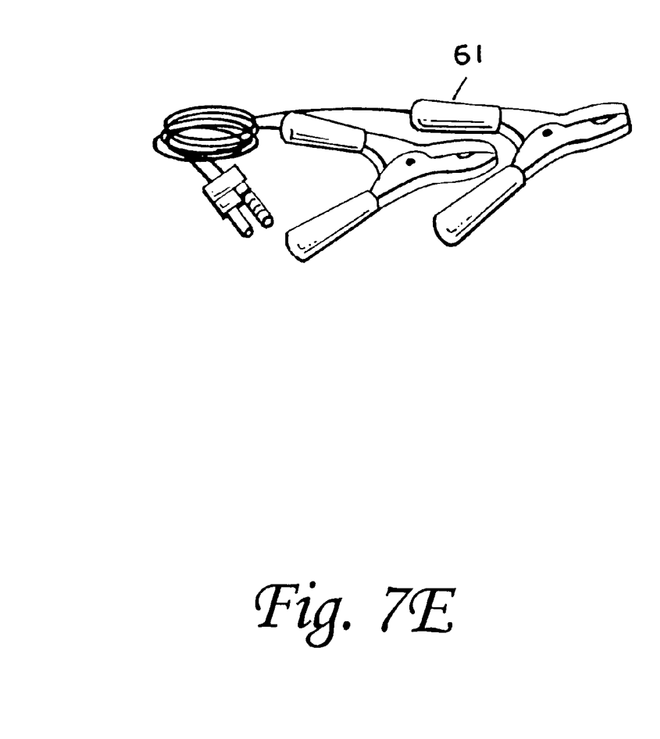
Figure 7F:
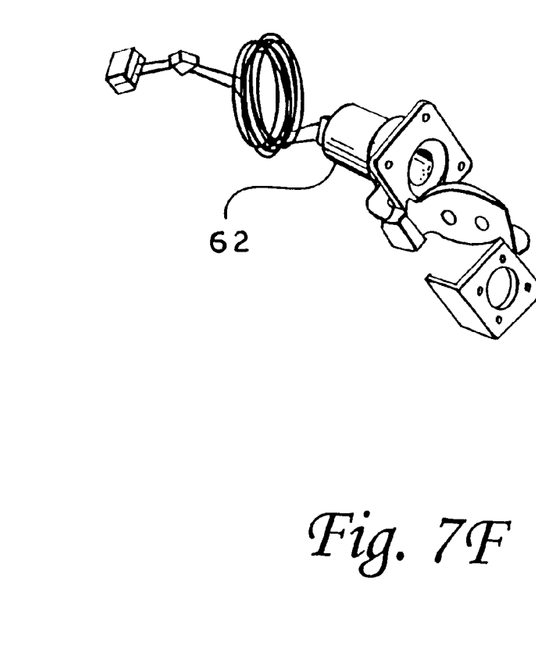
Figure 8A:
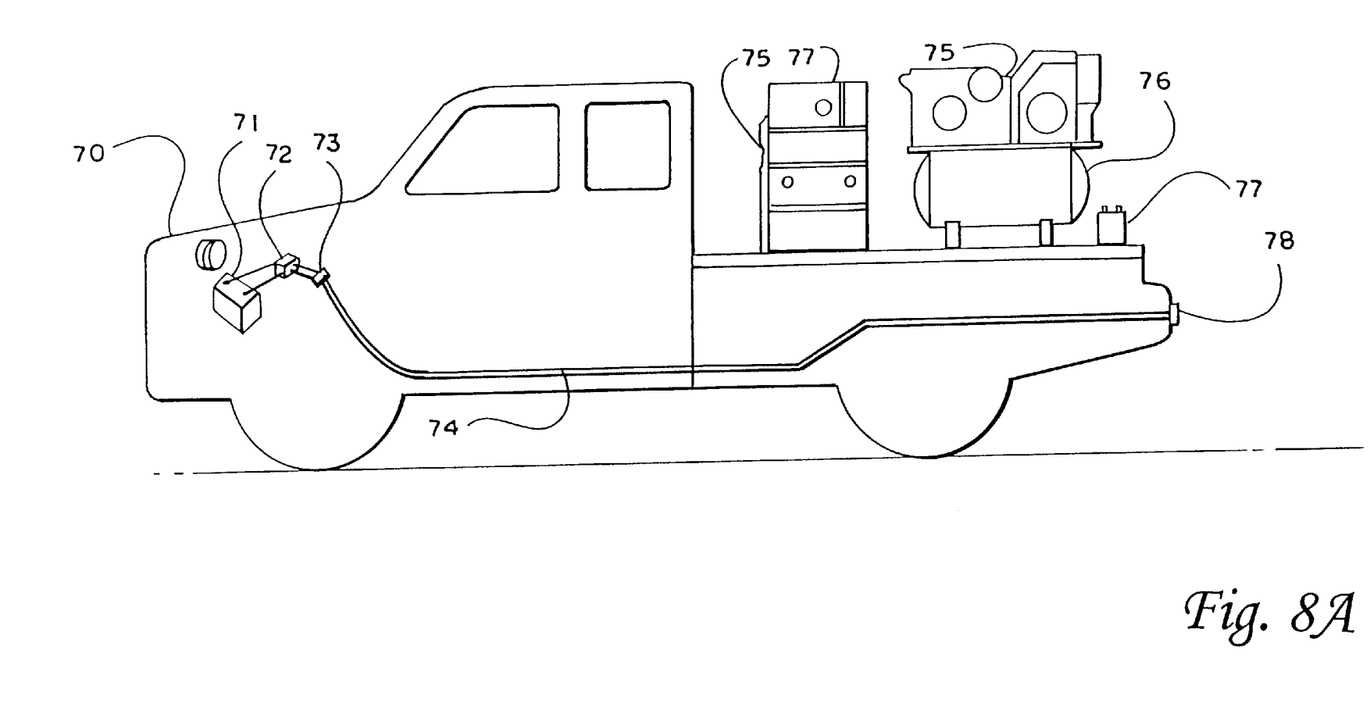
FIGS. 8A–G are diagramatic views of one embodiment of the present invention showing the charging system of the transporting vehicle connected to the battery of a welder being transported and/or to the battery of an air compressor being transported.
Figure 8B:
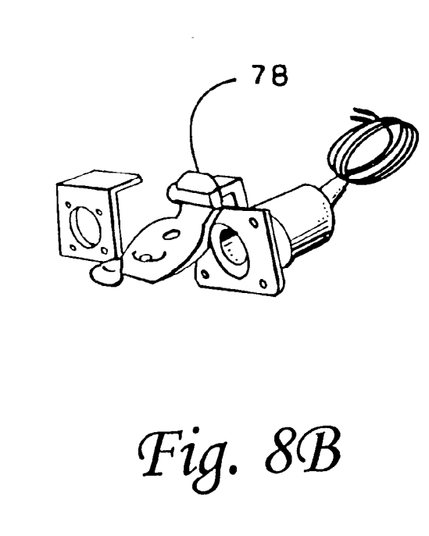
Figure 8C:
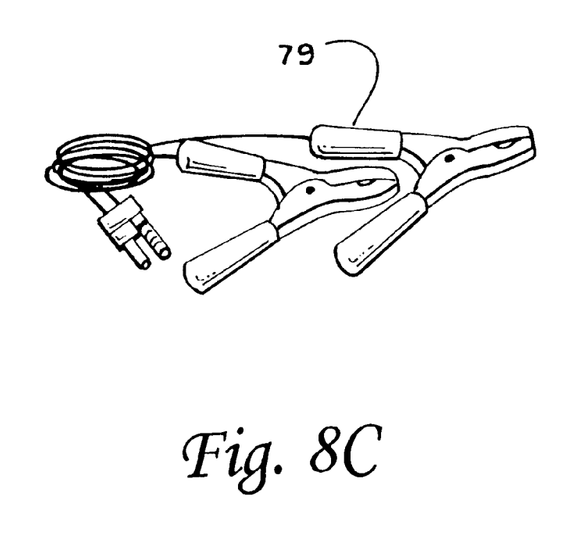
Figure 8D:
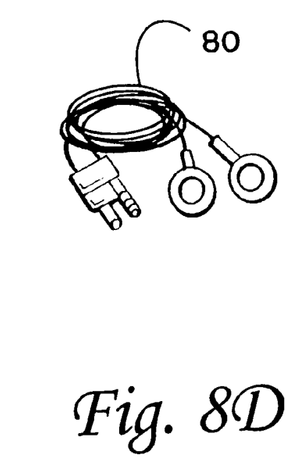
Figure 8E:
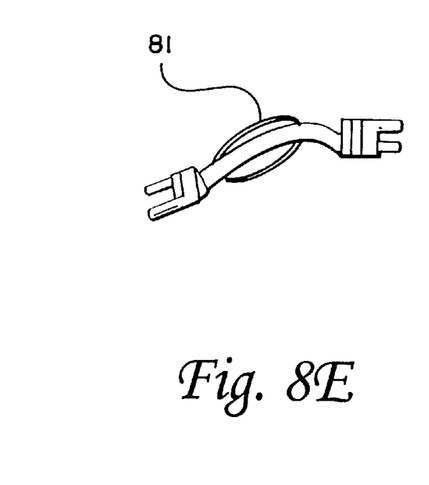
Figure 8F:
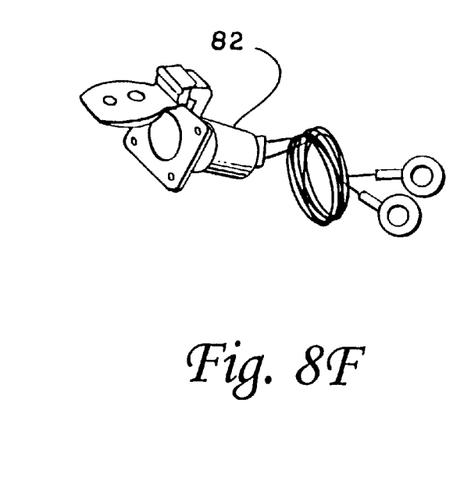
Figure 8G:
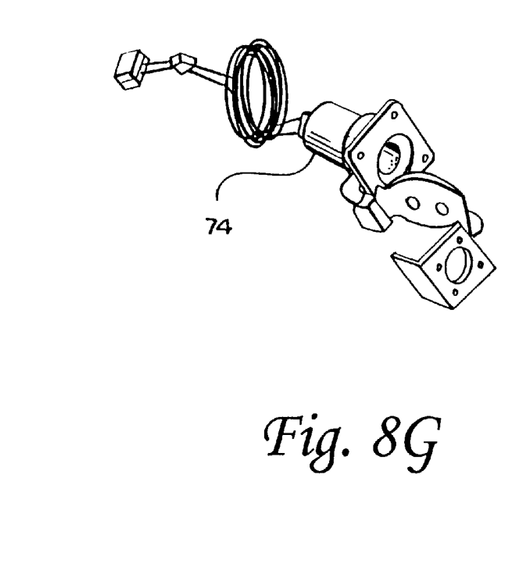

FIG. 5 shows one embodiment of the charging system of the invention whereby voltage generating means 10 is connected to fuse box or voltage regulator means 12 which in turn is connected to battery 11 by connections 20 and 21 between the wiring harness of a vehicle and the wiring harness of a boat or another vehicle containing battery 11.

The connection between the vehicle and boat wiring harnesses can be accomplished by known methods or connectors such as clamps, clips or plugs.

FIGS. 6A–G show one embodiment of the present invention illustrated by a vehicle towing a trailer carrying a boat thereon. Towing vehicle 30 is connected to towed trailer 31 which has thereon towed boat 32 having motor 33. Vehicle 30 has a charging system including battery 34, alternator 36, isolator 37, breaker or fuse 35, and wiring harness 38. Connector 39 is at the terminating end of harness 38. Connecting harness 40 connects the harness of the towed vehicle 41 with connector 39. Towed vehicle harness 41 completes the connection between vehicle harness 38 and towed vehicle battery 42. Known connectors between vehicle harness 38 and towed vehicle harness 41 are illustrated at 43, 44, 45, 46, 47, and 48.

FIGS. 7A–F show one embodiment of the present invention illustrated by a vehicle carrying a wheelchair. The transporting vehicle battery 50 is connected to the transporting vehicle charging system which includes alternator 51, isolator or solonoid 52, breaker or fuse 53, and wiring harness 54. Connector 60 is at the terminating end of harness 54. The device or apparatus 55, represented here by a wheelchair, carries a battery to be charged 56. Battery 56 may be connected to permanent harness 57 if the wheelchair has one 12-volt battery or permanent harness 58 if the wheelchair has two 12-volt batteries. Connecting harness 59 connects the permanent mounted harness with connector 60. Connectors usable with the present invention are illustrated at 57, 58, 59, 61, and 62.

FIGS. 8A–G depict an embodiment of the present invention illustrated by a vehicle transporting a gas-powered welder with an electric starting system 77 and a gas-powered air compressor 76 with an electric starting system. The transporting vehicle includes a battery 71 connected to the vehicle charging system, including alternator 70, isolator or solonoid 72 and breaker or fuse 73. The charging system is connected to the vehicle wiring harness 74 which terminates at plug 78. A battery 77 to be charged may be connected to plug 78. The battery, in turn, is connected to welder 77 and/or compressor 76 by temporary or permanent wiring harnesses and connectors 75. Connectors of the type usable with the present invention are illustrated at 74, 78, 79, 80, 81, and 82.

It is readily apparent that the battery charging system of this invention is capable of conveniently charging a battery being transported and to determine the charged condition thereof. Utilization of the electrical system of a transporting vehicle substantially reduces the cost of a battery charging system for a battery of a boat, cart, wheelchair, or the like and its operation. The charged condition is more accurately determined by the present system as the measurement is made by connecting a load resistor in the circuit which approximates an operating condition for the battery. A determination of the proper operation of the charging system may also be readily accomplished by the voltage measuring circuit. Incorporation of a continuity indicator in the charging system assures that the electrical system of the transported apparatus remains connected thereto while the transporting vehicle and transported apparatus are in transit.

What is claimed is:

1. Apparatus for charging the battery of a transportation device from the electrical system of a transporting vehicle, said device having an outlet coupled to said battery and said transporting vehicle having an outlet coupled to said electrical system comprising:

coupling means attached to the transporting vehicle;

coupling means attached to the transported device;

connecting apparatus for joining the two coupling means thereby connecting the transporting vehicle electrical system and the transported device battery;

a first electrical conductor coupled to a housing having first and second inputs, adapted for coupling to said transported device outlet;

a second electrical conductor coupled to the housing second input, adapted for coupling to said transporting vehicle outlet;

circuit means, disposed inside said housing means;

switch means coupled between circuit means and said second input operable to isolate said second electrical conductor from said circuit means; and a display means being visible from outside said housing, coupled to said circuit means; said display means indicating the extent to which said transported device battery has been recharged.

2. The apparatus of claim 1 wherein the transported device is carried on or within the transporting vehicle.

3. The apparatus of claim 1 wherein the transported device is carried on a trailer towed by the transporting vehicle.

4. The apparatus of claim 1 wherein the transported device is towed by the transporting vehicle.

5. The apparatus of claim 1 wherein the transported device is a boat.

6. The apparatus of claim 1 wherein the transported device is a golf cart.

7. The apparatus of claim 1 wherein the transported device is a wheelchair.

8. The apparatus of claim 1 wherein the transported device is farm equipment.

9. The apparatus of claim 1 wherein the transported device is a welder.

10. The apparatus of claim 1 wherein the transported device is a compressor.

11. In combination with a towing vehicle provided with an operating electrical system having a means for generating voltage; a battery charging system including a battery to be charged operably connected to a trailer or device carried thereby towed by the towing vehicle comprising a battery charging circuit for interconnecting the electrical system of the trailer or device carried thereby with a terminal of the voltage source supplying a battery charging voltage and a ground terminal; a voltage measuring circuit for determining the charged condition of a battery connected thereto and for alternately determining the charging voltage of the system, said voltage measuring circuit including an electrical load resistance provided with an adjustable tap having a first terminal connected to said charging circuit and a second terminal connected to a grounded terminal of the towing vehicle through a switch means and a meter mechanism for providing a visual indication of the voltage of said charging system, said meter mechanism having a first terminal connected to said first terminal of said resistance and a second terminal connected to the adjustable tap of said resistance, said adjustable tap being positioned on said resistance to provide a meter indication proportional to the voltage of said charging system, said second terminal of said meter mechanism being connected to the adjustable tap of said resistance through a diode.

12. In combination with a transporting vehicle provided with an operating electrical system having a means for generating voltage; a battery charging system for a battery carried by a device or operably connected to a towed trailer or a device carried thereby and the battery to be charged having a voltage substantially less than that of the electrical system of the transporting vehicle, comprising a charging circuit including an electrical resistance connected in series with a terminal of the battery to be charged for reducing the voltage supplied by said charging system to that required for charging of said battery; a voltage measuring circuit and a switch means for alternately connecting said voltage measuring circuit with the battery to be charged to determine the charged condition thereof and for connecting said charging circuit to the battery for charging and to said voltage measuring circuit for determining the charging voltage of the system, said voltage measuring circuit including an electrical load resistance provided with an adjustable tap having a first terminal connected to a common terminal of said charging resistance and of the batten to be charged and a second terminal connected to a ground terminal through said switch means and a switch contact for momentarily completing a circuit therethrough, and a meter mechanism for providing a visual indication of the voltage of said charging system, said meter mechanism having a first terminal connected by said switch means to said common terminal and a second terminal connected to said adjustable tap by said switch means through a diode, said adjustable tap being positioned on said resistance to provide a meter indication proportional to the voltage of the charging system or of the battery being charged.

13. The combination of claim 12 in which said voltage measuring circuit includes a second electrical load resistance provided with an adjustable tap having a first terminal connected to said first terminal of the meter mechanism and a second terminal connected to said ground terminal through said switch means and said switch contact, said second terminal of the meter being connected to said adjustable tap by said switch means through a diode, said switch means being operable to disconnect said charging circuit from said voltage source and to disconnect said first voltage measuring circuit therefrom and to connect said second voltage measuring circuit to said voltage source whereby the charged condition of the battery of the transporting vehicle may be determined or to determine the charging voltage supplied thereto.

14. A method for charging the battery of a device from the electrical system of a vehicle, said device having an outlet coupled to said battery and said vehicle having an outlet coupled to said electrical system comprising the steps of:

providing coupling means attached to the vehicle;

providing coupling means attached to the device;

connecting the two coupling means thereby connecting the vehicle electrical system and the device battery;

providing a first electrical conductor coupled to a housing having first and second inputs, adapted for coupling to said device outlet;

providing a second electrical conductor coupled to the housing second input, adapted for coupling to said vehicle outlet;

disposing a circuit means inside said housing means;

coupling a switch means between the circuit means and said second input operable to isolate said second electrical conductor from said circuit means; and coupling a display means so as to be visible from outside said housing, to said circuit means; said display means capable of indicating the extent to which said device battery has been recharged.

15. The method of claim 14 wherein the device is transported on or within the transporting vehicle.

16. The method of claim 14 wherein the device is transported on a trailer towed by the transporting vehicle.

17. The method of claim 14 wherein the device is towed by the transporting vehicle.

18. The method of claim 14 wherein the device is a boat.

19. The method of claim 14 wherein the device is a golf cart.

20. The method of claim 14 wherein the device is a wheelchair.

21. The method of claim 14 wherein the device is farm equipment.

22. The method of claim 14 wherein the device is a welder.

23. The method of claim 14 wherein the device is a compressor.

* * * * *